Inventors
Reginald E. Charlwood
Robert L. Risberg
By H R Rucker
Attorney

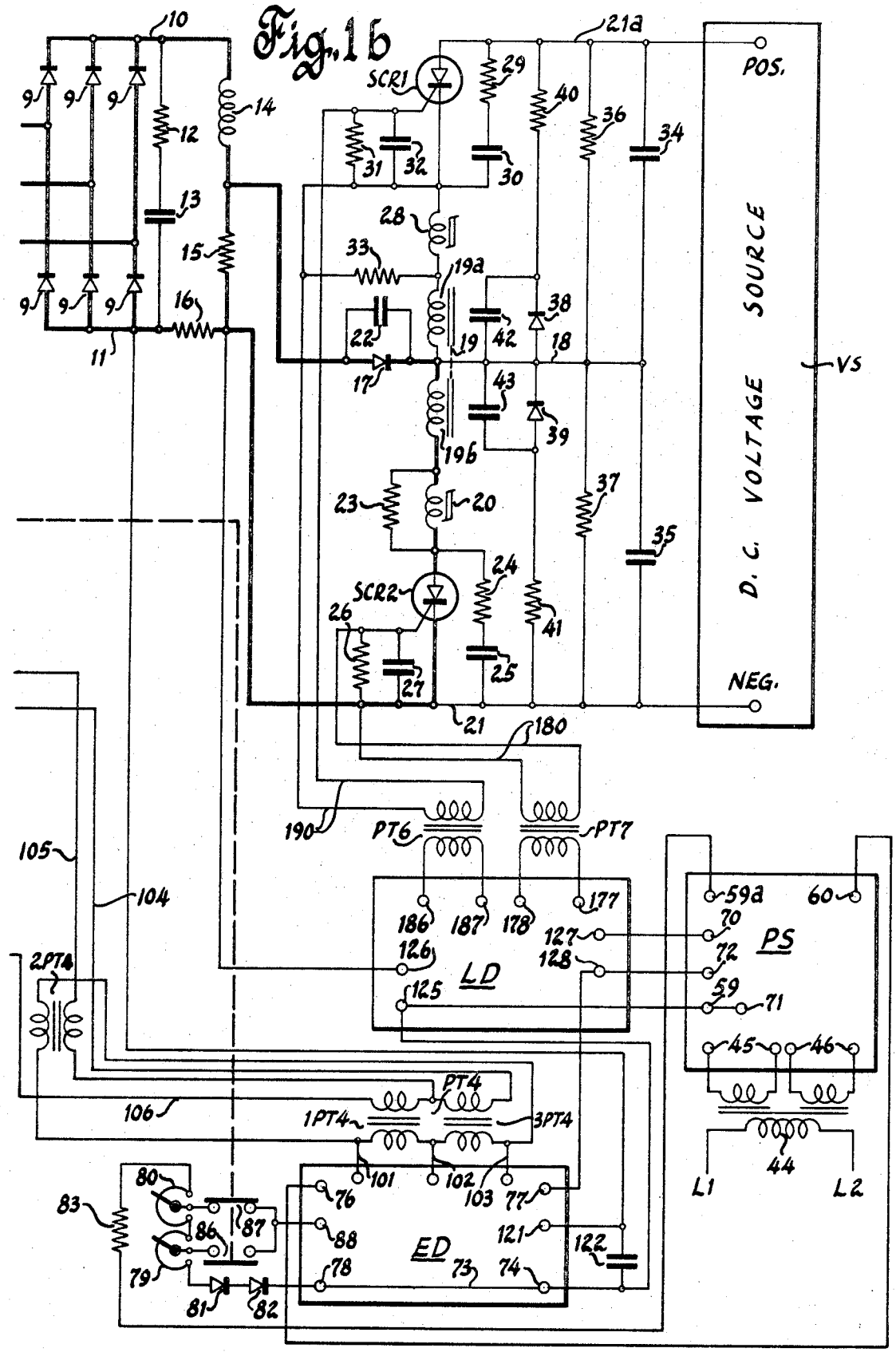

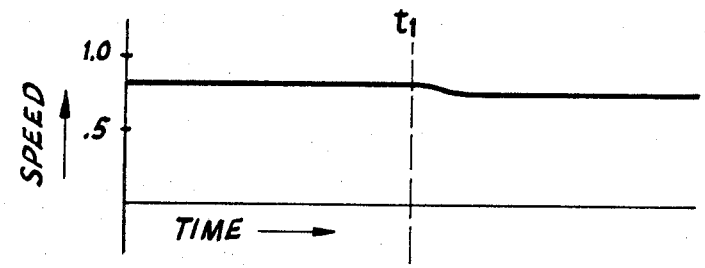
Fig. 5a
Fig. 5b
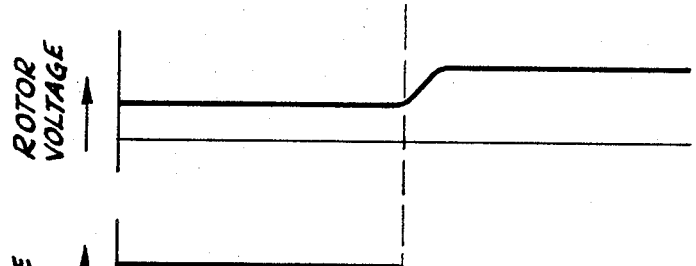
Fig. 5c
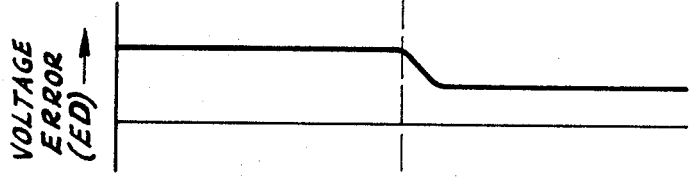
Fig. 5d
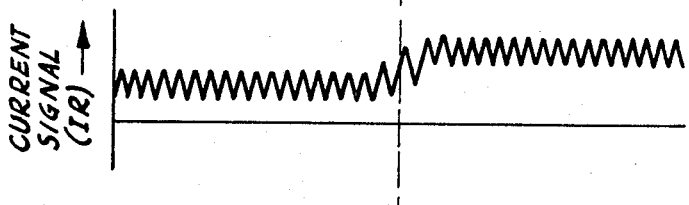
Fig. 5e
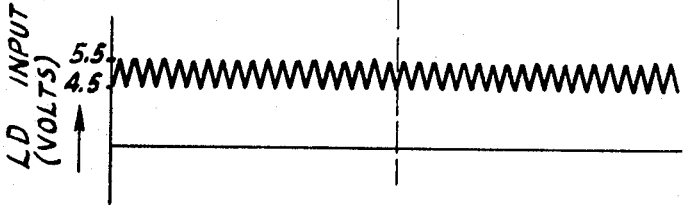
LD = ED + IR = CONSTANT MEAN VALUE

United States Patent Office 3,519,912
Patented July 7, 1970

3,519,912
CURRENT REGULATED SPEED CONTROL SYSTEM FOR WOUND ROTOR A.C. MOTORS
Reginald E. Charlwood, Menomonee Falls, and Robert L. Risberg, Milwaukee, Wis., assignors to Cutler-Hammer, Inc., Milwaukee, Wis., a corporation of Delaware
Filed Dec. 5, 1967, Ser. No. 688,071
Int. Cl. H02p 5/40
U.S. Cl. 318—237                                    6 Claims

ABSTRACT OF THE DISCLOSURE

A motor control system for a wound rotor A.C. motor comprising an energy absorbing chopper-type circuit in the motor secondary circuit for speed regulation. Control means are provided which include secondary voltage feedback means and secondary current regulating means. The system further includes reversing, inching and plugging controls.

BACKGROUND OF THE INVENTION

This invention relates to motor control systems for wound rotor motors and more particularly to systems which are particularly well adapted to run printing presses.

When running a printing press, particularly a color printing press, it is important that power be applied smoothly to the mechanism and that sudden changes, surges or transients in power be avoided. Unsteadiness in the printing press operation can cause registration problems or smearing of a color with consequent changes in color in the final printed product.

One of the particular problems to which the invention is directed is that of line voltage changes or transients. As will be seen later this control is particularly insensitive to line voltage changes.

A wound rotor motor is intrinsically less sensitive to line voltage changes than a D.C. motor. The use of wound rotor motors for printing press drives is old and the advantages in smoothness resulting from the use of such motors are well recognized. The present invention relates to the adaptation in an improved manner of wound rotor motors to drives such as used in printing presses and other additional improvements and advantages.

The use of a chopper type resistance circuit in the secondary of a wound rotor motor is shown in Pat. No. 3,227,937, issued to Floris Koppelmann et al. on Jan. 4, 1966.

SUMMARY OF THE INVENTION

It is an object of the invention to provide an automatic speed control for a wound rotor motor which is suitable for driving a load which requires a smooth application of power.

It is a further object of the invention to provide a control of the aforedescribed type which is relatively insensitive to changes in line voltage.

Other objects and advantages of the invention will hereinafter appear.

These objects are accomplished by providing a controller sensitive to both torque and speed signals, controlling the load impedance in the secondary of a wound rotor motor by a chopper-type circuit. The system is provided with a secondary voltage feedback signal which varies inversely as the motor speed and varies directly as the line voltage. The speed setting signal is also arranged to vary with the line voltage. Further the variation with line voltage of the speed feedback and speed setting signal are arranged to offset each other to contribute to the system's insensitivity to line voltage.

The control system includes a minor feedback loop sensitive to motor secondary current. The system can be arranged to regulate motor torque or motor speed.

BRIEF DESCRIPTION OF THE DRAWINGS

FIGS. 1a and 1b together form a diagram of a motor control system embodying the present invention;

FIGS. 5a to 5e are operating curves for the system.

DESCRIPTION OF THE PREFERRED EMBODIMENT

Figure 1A:
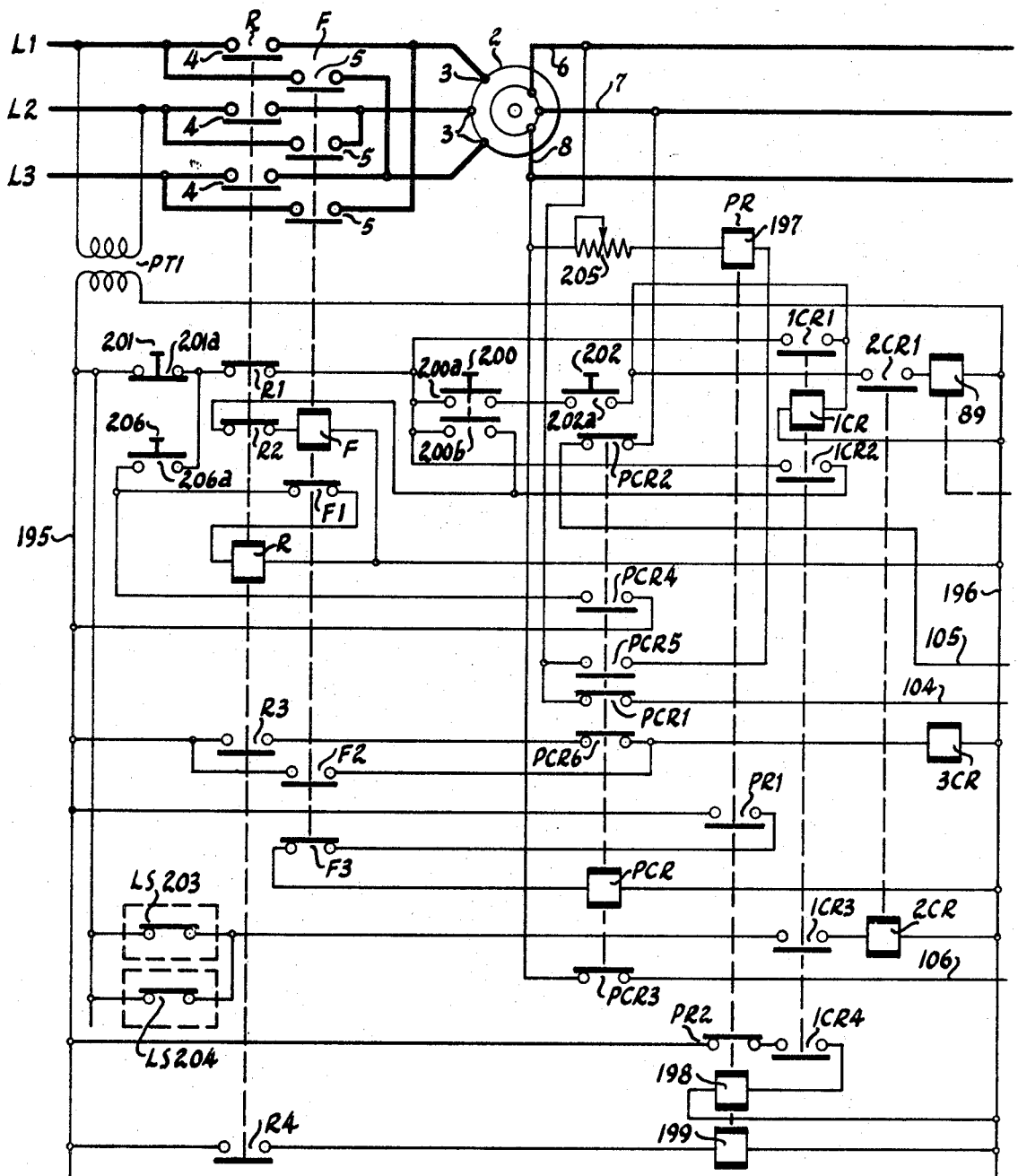

Referring to the drawings, there is a three phase A.C. wound rotor motor 2 having primary terminals 3 powered from three phase power lines L1, L2 and L3 through a conventional forward and reverse switching arrangement comprising reverse contacts 4 and forward contacts 5. The motor secondary winding terminals are connected through conductors 6, 7 and 8 to a conventional three phase full wave rectifier circuit comprising six rectifying diodes 9 which convert the three phase motor secondary current to direct current in a positive conductor 10 and a negative conductor 11. A resistor 12 and a capacitor 13 are connected in series across conductors 10 and 11 to suppress transient voltages resulting from diode recovery phenomenon. A series inductor 14 carries the positive output of conductor 10 to a secondary resistor 15 which is the principal secondary impedance element for dissipation of secondary current. A signal resistor 16 which is connected in series with resistor 15 contributes to a small extent to the total secondary impedance but is intended primarily as a secondary current signal source, the voltage thereacross being proportional to the motor secondary current and substantially proportional to the motor torque.

A chopper type circuit which includes a pair of silicon controlled rectifiers SCR1 and SCR2 is provided to intermittently shunt out resistor 15. This chopper circuit together with inductor 14 and resistor 15 comprise an energy absorbing circuit of a type disclosed in the Robert L. Risberg, Pat. No. 3,365,642, issued Jan. 23, 1968, and assigned to the present assignee. When resistor 15 is shunted the current through inductor 14 increases. When the sum of this current signal (as sensed by resistor 16) and the amplified speed error signal (as later described) reaches the desired maximum level, SCR2 is turned off to remove the shunt. With the introduction of the resistance of resistor 15 in series with inductor 14 the current decreases. When the sum of current and speed error signals reaches a desired minimum value, SCR2 is turned on and the process repeats. Thus, the secondary current can be regulated about a variable mean value to effectively regulate the motor secondary impedance and consequently control the motor speed.

When SCR2 is conductive and thus shunting resistor 15, current flows from inductor 14 through a diode 17 to a center conductor 18 which is connected to the center tap of a commutating inductor 19 having two windings 19a and 19b wound on a common magnetic core. The current then flows through winding 19b through a saturable inductor 20 and SCR2 to a negative conductor 21 which carries the current back to a point between resistor 15 and signal resistor 16. Inductor 20 protects SCR2 against unduly rapid changes in current when SCR2 is fired. A capacitor 22 is connected across diode 17 to absorb diode 17 recovery transients. A resistor 23 is connected across inductor 20 to provide a path for reverse current through SCR2 during turn-off time. A resistor 24 and a capacitor 25 in series from the anode to the cathode of SCR2 protect SCR2 from too rapid changes in voltage. A gate resistor 26 and a transient suppressing capacitor 27 are connected in parallel from the gate of SCR2 to the negative conductor 21.

A similar circuit leg from a positive conductor 21a to the center conductor serves as a method for commutating the current in SCR2. This second circuit leg includes SCR1, a saturable inductor 28 and winding 19a. Inductor 28 protects SCR1 against rapid changes in current when SCR1 is fired. A resistor 29 and a capacitor 30 are connected in series from the anode to cathode of SCR1 to protect against rapid changes in voltage. A resistor 31 and a capacitor 32 are connected from the gate of SCR1 to the cathode of SCR1. A resistor 33 is connected across inductor 28.

A pair of commutating capacitors 34 and 35 are connected in series from positive conductor 21a to negative conductor 21 and are connected together to center conductor 18. When SCR1 is fired, capacitor 34 discharges through winding 19a. Consequently, a voltage is induced in winding 19b to reverse bias SCR2 and turn it off. Similarly, the energy stored on capacitor 35 serves to turn off SCR1. A resistor 36 is connected in parallel with capacitor 34 and a resistor 37 is in parallel with capacitor 35 to provide discharge paths. A pair of free wheeling diodes 38 and 39 are respectively connected in series with resistors 40 and 41 which dissipate the commutation energy. Capacitors 42 and 43 are respectively connected across diodes 38 and 39 to protect diodes 38 and 39, respectively, from transients. A D.C. voltage source VS applies a voltage to conductors 21a and 21 to alternately charge capacitors 34 and 35 to provide commutation energy. The charging voltage could, for example, be 600 v. D.C. The turn "off" of one SCR and the commutation of its load current by the components described in the foregoing 4 paragraphs is described in the aforementioned Pat. No. 3,365,642.

Control of the aforedescribed motor secondary circuit is accomplished by an error detector circuit ED and a a level detector and firing circuit LD. These two control circuits receive D.C. electrical power from a power supply PS.

Figure 3:
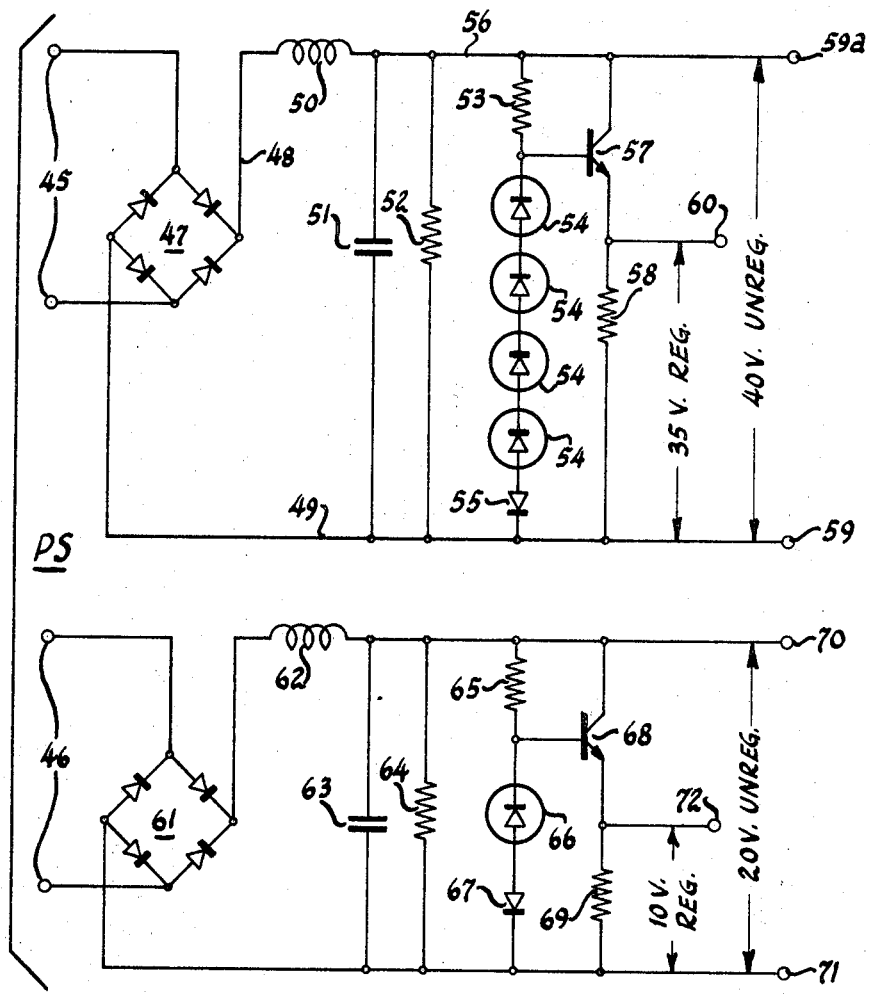
FIG. 3 is a diagram of two power supply circuits which together comprise the power supply used in the diagram of FIG. 1.

FIG. 3 shows the power supply PS which consists of two somewhat similar circuits, each of which has regulated and unregulated outputs. The power supply A.C. input is obtained from a dual secondary winding power transformer 44, the primary of which is supplied from A.C. power lines L1 and L2. Transformer 44 supplies 53 v. A.C. to a pair of terminals 45 and 25 v. A.C. to a pair of terminals 46 of power supply PS. A bridge rectifier 47 supplies direct current to a positive conductor 48 and a negative conductor 49. A filtering network is provided and includes an inductor 50, a capacitor 51 and a resistor 52. A conventional voltage regulation circuit is provided with a resistor 53 in series with four Zener diodes 54 and a diode 55 between a positive conductor 56 and a negative conductor 49 to provide a substantially constant voltage between the base of a regulating transistor 57 and conductor 49. Diode 55 compensates for the base to emitter drop in transistor 57. A load resistor 58 is connected between the emitter of transistor 57 and conductor 49. A 40 volt filtered, but unregulated voltage appears between terimnals 59a and 59. A regulated 35 volts appears between conductor 60 and conductor 59. Similarly, the other section of power supply PS includes a bridge rectifier 61, an inductor 62, a capacitor 63 and a resistor 64. The regulating portion includes a resistor 65, a Zener diode 66, a diode 67, a transistor 68 and a load resistor 69. A filtered, but unregulated voltage of 20 volts appears between terminals 70 and 71. A regulated 10 volts appears between terminals 72 and 71.

Figure 2:
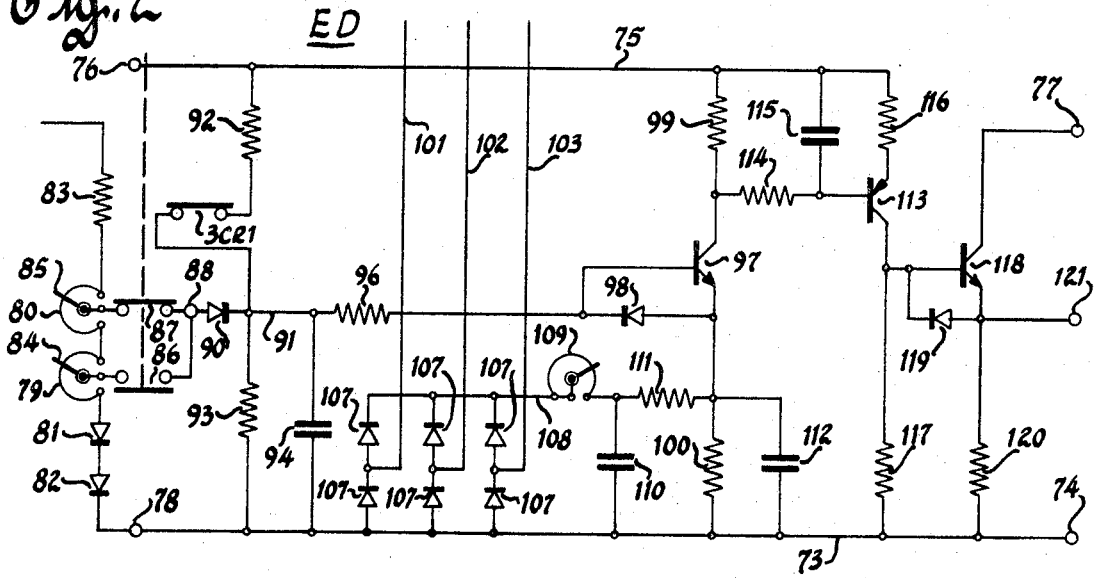
FIG. 2 is a diagram of an error detection circuit used within the diagram of FIG. 1.

The error detection circuit ED shown in FIG. 2 serves to compare the signal indicative of desired speed with the feedback signal indicative of the actual motor speed and to provide an output signal representative of the difference between the actual and desired motor speeds. The error detector circuit has a negative or ground conductor 73 which connects through a terminal 74 to terminal 59 on the power supply PS. A positive conductor 75 is connected through a terminal 76 to the regulated positive 35 volt terminal 60 of power supply PS. A terminal 77 is connected to the regulated 10 volt terminal 72 of power supply PS.

The negative conductor 73 is connected through a terminal 78 to reference potentiometer circuit comprising a fast speed setting potentiometer 79 and a trip slow speed setting potentiometer 80 connected in series. A pair of series connected diodes 81 and 82 connect potentiometer 79 to terminal 78, and compensate for voltage drop of two semi-conductor junctions elsewhere in the error detection circuit. Potentiometer 80 is connected through a resistor 83 to the unregulated 40 volt terminal 59a of power supply PS. This connection of the reference potentiometers 79 and 80 to an unregulated source causes the speed reference voltages appearing at potentiometers 79 and 80 to vary directly as the line voltage of power lines L1 and L2. This variation of the speed references is a feature which contributes to the stability of the overall system under conditions of varying line voltage in a manner which will be explained later.

The sliders 84 and 85 may be alternately connected through relay contacts 86 and 87, respectively, to a speed reference input terminal 88. Contacts 87 are normally closed and contacts 86 are normally open. Energization of "fast" relay coil 89 causes contacts 86 to close and contacts 87 to open and thereby substitute the high speed reference potentiometer 79 for the trip slow reference potentiometer 80.

A unilateral conducting diode 90 connects the speed reference to a conductor 91 and prevents current flow in the reverse direction. When the system is in the stopped condition contacts 3CR1 of a relay 3CR are normally closed. A pair of resistors 92 and 93 then form a voltage divider and are of such relative values that a relatively high voltage appears at conductor 91 which is effective as a "stop" signal to the error detection circuit ED. When the system is in a "run" condition contacts 3CR1 open and conductor 91 is then subjected to a speed signal from either potentiometer 79 or potentiometer 80. A capacitor 94 forms a time delay means to limit the rate of change of the speed signal at conductor 91. For instance, upon starting it is desirable that the signal voltage decreases gradually so that the motor and driven machine are not subjected to too rapid acceleration.

A base resistor 96 connects the reference speed signal to the base of a PNP comparator transistor 97. A diode 98 protects transistor 97 against excessive reverse base to emitter voltages. Transistor 97 serves to compare the speed feedback signal at its emitter with the speed reference signal at its base. The error signal appears at the collector of transistor 97 and across a load resistor 99.

The speed feedback signal appears across a feedback resistor 100 and is derived from the three phase A.C. motor secondary voltage appearing at conductors 6, 7 and 8. It will be apparent that the magnitude of the speed signel appearing across resistor 100 is inversely proportional to motor speed since the secondary voltage varies inversely as the motor speed. It is also important to note that the magnitude of the speed feedback signal will vary directly with the power line voltage in L1, L2 and L3 since the secondary voltage of the wound rotor motor so varies. The importance of the relationship between the speed feedback signal variation and the speed reference signal variations as a result of line voltage fluctuations will be more fully explained later.

The speed feedback signal circuit comprises three conductors 101, 102 and 103 which connect to the delta secondary of a three phase transformer PT4 consisting of three transformer sections 1PT4, 2PT4 and 3PT4. The star primary winding of transformer PT4 connect through conductors 104, 105 and 106 and through contacts PCR1, PCR2 and PCR3, respectively, to motor secondary conductors 6, 7 and 8. A full-wave three phase bridge rectifier consisting of 6 diodes 107 connects to negative conductor 73 and rectifies the feedback signal to apply a positive feedback signal to a conductor 108. A variable resistor 109 is provided to selectively adjust the magnitude of the feedback signal. A capacitor 110 and a resistor 111 serve to smooth the feedback signal. A capacitor 112 connected across feedback resistor 100 serves as a noise filter.

The error signal at the collector of transistor 97 is conducted to the base of a PNP transistor 113 by a base resistor 114. A capacitor 115 is connected between the base of transistor 113 and conductor 75. A resistor 116 connects the emitter of transistor 113 to the positive conductor 75. A load resistor 117 is connected between the collector of transistor 113 and the negative or ground conductor 73. Transistor 113 serves to amplify and invert the speed error signal and to provide an output at its collector which is connected directly to the base of an emitter follower output transistor 118. A diode 119 is connected between the emitter and base of transistor 118 to protect transistor 118 against excessive reverse base to emitter voltages. A load resistor 120 is connected between the emitter of transistor 118 and conductor 73. A regulated 10 volts is applied to the collector of transistor 118 through terminal 77. The output error signal voltage appears between terminals 121 and 74, terminal 121 being the positive terminal.

As can be seen, that when the motor speed decreases, the feedback signal at the emitter of transistor 97 increases and the error output signal at voltage terminal 121 decreases. As will be seen, that such a decreasing error signal calls for an increase in motor speed.

A capacitor 122 is connected across terminals 121 and 74 for noise suppression.

Figure 4:
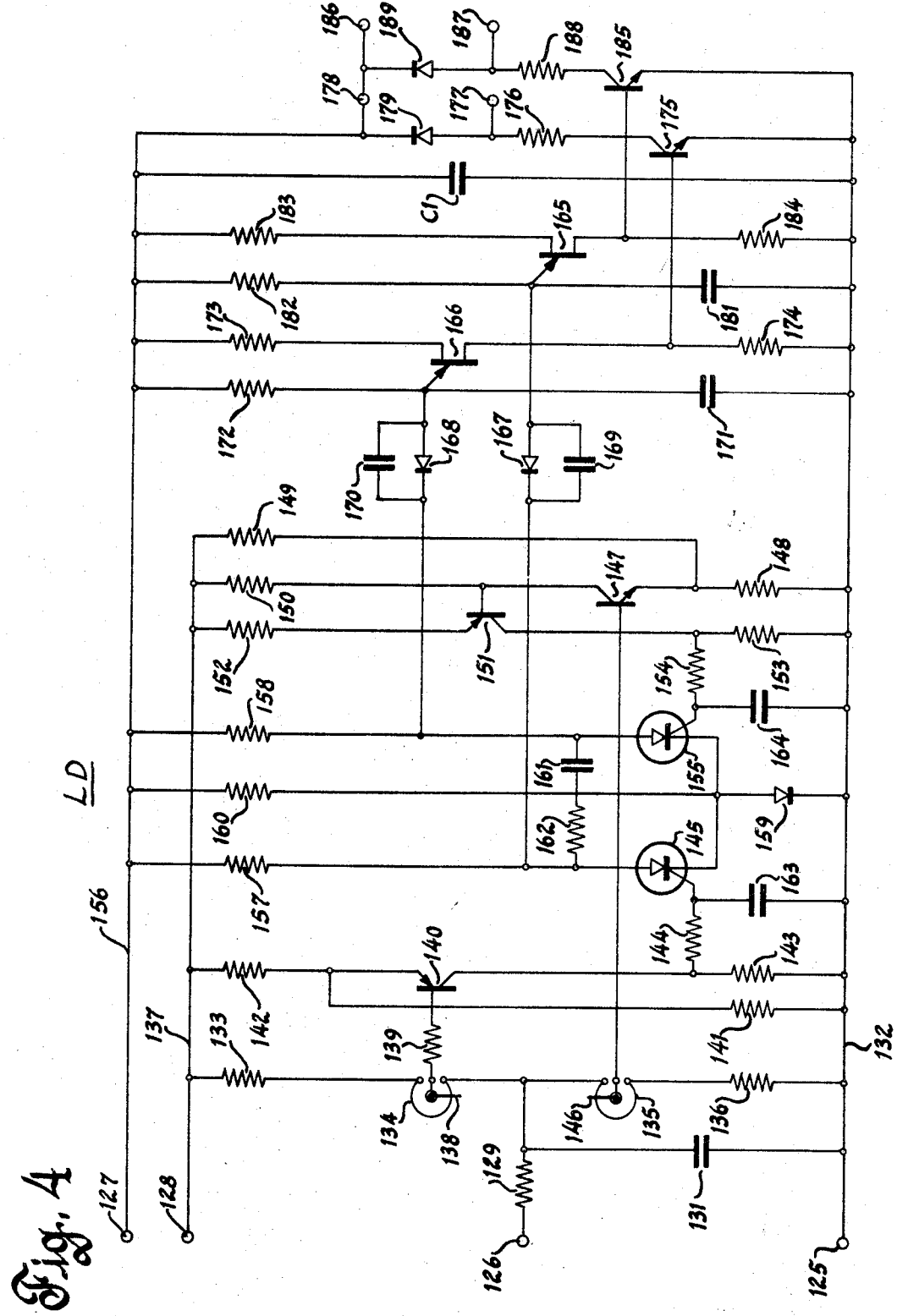
FIG. 4 is a diagram of a level detection and firing circuit used in the diagram of FIG. 1.

The level detector and firing circuit LD shown in FIG. 4 serves to control the firing of SCR1 and SCR2 and consequently the motor secondary impedance in response to the magnitude of the input signal applied to terminals 125 and 126. This input signal is the algebraic resultant of the error signal appearing at terminals 121 and 74 of the error detector circuit ED and the secondary current signal appearing across signal resistor 16 since these two sources of signal voltages are connected in series across terminals 125 and 126.

Level detection and firing circuit LD is powered by power supply PS. Terminal 125 is connected to the negative or ground terminal 59 of power supply PS. A terminal 127 receives positive 20 volts unregulated D.C. from terminal 70. The regulated positive 10 volt supply of terminal 72 is connected to a terminal 128.

The input signal terminal 126 is connected through a resistor 129 to a center point 130. A capacitor 131 is connected between point 130 and a negative or ground conductor 132. The combination of resistor 129 and capactior 131 serves as an RC filter to suppress undesired transients or noise from the signal at terminal 126. Point 130 is at the center of a voltage divider consisting of a resistor 133, a potentiometer 134, a potentiometer 135 and a resistor 136 connected in series between positive conductor 137 and negative conductor 132.

A slider 138 on potentiometer 134 is connected through a base resistor 139 to the base of a PNP transistor 140. The emitter of transistor 140 is connected to the junction between resistors 141 and 142 which are connected in series between conductors 137 and 132. A load resistor 143 is connected between conductor 132 and the collector of transistor 140. A resistor 144 connects the collector of transistor 140 to the gate of a silicon controlled rectifier 145.

A slider 146 on potentiometer 135 is connected to the base of an NPN transistor 147. The emitter of transistor 147 is connected to the junction point between resistors 148 and 149 which are connected in series across conductors 137 and 132. A load resistor 150 connects the collector of transistor 147 to conductor 137. The collector of transistor 147 is also connected to the base of a PNP transistor 151 which serves to invert the signal from transistor 147. The emitter of transistor 151 is connected through a resistor 152 to conductor 137. A load resistor 153 is connected between the collector of transistor 151 and conductor 132. A resistor 154 connects the collector of transistor 151 to the gate of a silicon controlled rectifier 155.

Silicon controlled rectifiers 145 and 155 with associated circuitry comprise a commutated bistable switching circuit of a well known type in which is silicon controlled rectifiers 145 and 155 are rendered alternately conductive. The anodes of silicon controlled rectifiers 145 and 155 are connected to a conductor 156 through resistors 157 and 158, respectively. The cathodes of silicon controlled rectifiers 145 and 155 are connected together and to conductor 132 through a unidirectional conducting diode 159. A resistor 160 is connected between conductor 156 and the cathodes of silicon controlled rectifiers 145 and 155. Resistor 160 and diode 159 furnish a small reverse bias to the cathode to gate circuits of silicon controlled rectifiers 145 and 155. A commutating capacitor 161 and a series resistor 162 are connected between the anodes of silicon controlled rectifiers 145 and 155. A pair of capacitors 163 and 164 are connected between the gates of silicon controlled rectifiers 145 and 155 and conductor 132 for transient suppression. As is well known, the circuit just described causes one of silicon controlled rectifiers 145 and 155 to be turned off when the other is fired. For instance, if silicon controlled rectifier 145 is conducting and silicon controlled rectifier 155 is nonconducting, capacitor 161 charges through resistor 158, resistor 162, silicon controlled rectifier 145 and diode 159. When silicon controlled rectifier 155 is fired, the discharge of capacitor 161 causes a sudden voltage drop at the anode of silicon controlled rectifier 145 sufficient to turn it off.

The anodes of silicon controlled rectifiers 145 and 155 are connected to the emitters of unijunction transistors 165 and 166 by diodes 167 and 168, respectively, to thereby control the operation of a corresponding pair of identical unijunction transistor relaxation oscillators of a well known type. Capacitors 169 and 170 are connected across diodes 167 and 168, respectively, to discharge to the gates of unijunction transistors 165 and 166 upon the first operations of silicon controlled rectifiers 145 and 155 to thereby insure proper operation of the oscillators upon starting of the system. A capacitor 171 connected to conductor 132 charges through a resistor 172 which connects to conductor 156. The junction between resistor 172 and capacitor 171 is connected to the emitter of unijunction transistor 166. The base circuit extends from conductor 156 through a resistor 173, base two and base one of unijunction transistor 166 and a load resistor 174. Base one of unijunction transistor 166 is connected to the base of a switching NPN transistor 175 which serves to amplify the output of the circuit. The emitter of transistor 175 is connected to conductor 132. The collector of transistor 175 is connected through a current limiting resistor 176 to an output terminal 177. A corresponding positive output terminal 178 is connected to conductor 156. The primary winding of a pulse transformer PT7 is connected across terminals 177 and 178. A free wheeling diode 179 is connected across terminals 177 and 178 and the primary winding of transformer PT7. A pair of leads 180 connected to the secondary of pulse transformer PT7 deliver pulses to SCR2. A capacitor C1 connected across conductors 132 and 156 acts to prevent rapid change in the 20 volt supply due to noise or external disturbances.

Similarly, there is provided a circuit for delivering gating pulses to SCR1. The relaxation oscillator comprises a capacitor 181, unijunction transistor 165 and resistors 182, 183 and 184. A switching transistor 185 amplifies the gating pulses which then appear at terminals 186 and 187. A current limiting resistor 188 and a free wheeling diode 189 are also provided. The primary winding of a pulse transformer PT6 is connected across terminals 186 and 187 and the secondary winding delivers gating pulses to SCR1 through a pair of leads 190.

The level detector circuit LD is adjusted by means of potentiometers 134 and 135 so that the signal voltage at terminal 126 of circuit LD is maintained at an average value which might for instance be positive 5 volts. The upper and lower limits of the operating range of the input to circuit LD as set on potentiometers 135 and 134 could be 5.5 volts and 4.5 volts, respectively. The 5 volt mean value is the algebraic sum of the error signal output of the error detector ED and the current feedback signal taken across resistor 16. If the error signal is less than 5 volts the difference must be made up by the current signal.

Slider 138 is preferably set so that silicon controlled rectifier 145 is fired when the input signal to circuit LD reaches 4.5 volts. This results in the clamping of the oscillator comprising transistor 165 and the unclamping of the oscillator comprising transistor 166. Gating pulses are then delivered to SCR2. When SCR2 conducts the motor secondary impedance decreases to thereby increase motor current. As the motor current increases, the input to circuit LD increases. Slider 146 is preferably set so that silicon controlled rectifier 155 is fired when the voltage at terminal 126 reaches 5.5 volts. At this point SCR1 will be fired to increase the motor secondary impedance and decreases the motor secondary current. It can be seen therefore that the level detector will try to regulate the operation of motor 2 so that the signal at terminal 126 oscillates between 4.5 volts and 5.5 volts about an average value of 5.0 volts. The frequency of this oscillation may be typically about 400 cycles per second. The motor secondary current changes at this frequency while the motor speed remains substantially constant.

FIGS. 5a through 5e illustrate certain operating characteristics of the system and the changes resulting from the imposition of an increased motor load at time $t_1$. FIG. 5a shows a slight decrease in motor speed at time $t_1$ which might be, for instance, from .80 full speed to .75. FIG. 5b shows the resultant increase of secondary motor voltage at time $t_1$ which in turn causes a decrease in voltage error signal (ED) at terminal 121 of circuit ED. The operation of the level detector and firing circuit LD causes the motor secondary load impedance to decrease and thereby cause an increase in the secondary signal (IR) across resistor 16 as shown in FIG. 5d. The constancy of the input signal to circuit LD is shown in FIG. 5e where this signal is shown to oscillate between 4.5 to 5.5 volts about a mean of 5.0 volts. The nature of the operation of circuit LD is such that the input to circuit (LD) equals the error signal (ED) plus the secondary current signal (IR) and equals a constant mean value.

The remainder of the control circuitry is of a type utilizing more conventional components such as electromagnetic contactors and relays which are powered principally from a pair of A.C. conductors 195 and 196 which are connected to the secondary of a power transformer PT1 which in turn receives its primary voltage from power lines L1 and L2. This circuit includes a forward contactor F having main power contacts 5 and control contacts F1, F2 and F3. A reverse contactor R has main contacts 4 and control contacts R1, R2, R3 and R4. Contacts 4 and 5 are arranged in a conventional reversing circuit to afford reversal of phases upon the alternate energization of either forward contactor F or reverse contactor R. Contacts R2 and F1 are arranged in a conventional manner as interlocking contacts to prevent the simultaneous energization of contactors R and F.

A plugging relay PR of a well known type generally described in the C. P. Feldhausen patent, No. 2,489,876 issued Nov. 29, 1949 is provided with contacts PR1 and PR2 and with three operating coils, a lockout coil 197, a reset coil 198 and a closing coil 199. The contacts are of a type which stay in one position or the other until acted upon by one of the operating coils. There is, for instance, no return spring on the contacts.

A plugging control relay PCR is provided with normally closed contacts PCR1, PCR2 and PCR3 as hereinbefore mentioned together with normally open contacts PCR4 and PCR5 and normally closed contacts PCR6. A first control relay 1CR has four sets of normally open contacts 1CR1 through 1CR4. A second control relay 2CR has normally open contacts 2CR1. There is also shown in FIG. 1a the operating coil of the previously mentioned relay 3CR.

To run motor 2 forward at inching or trip slow speed an "inch" momentary pushbutton 200 is depressed. Current then flows through the normally closed contacts 201a of a momentary "stop" pushbutton 201 and through contacts 200b of the "inch" button. The current then flows through the normally closed interlocking contact R2 to the coil of forward contactor F. Contacts 5 close to energize motor 2 in the forward direction. Simultaneously, interlocking contact F1 opens to prevent energization of the reverse contactor R. Contacts F2 close to energize relay 3CR to open contacts 3CR1 in the error detection circuit and thereby render the "trip slow" speed setting potentiometer 80 effective. The motor 2 is therefore controlled at "trip slow" speed. Also contacts F3 open to prevent energization of the plugging control relay PCR.

The motor 2 is started at running speed by simultaneously depressing the "inch" pushbutton 200 and a "run" pushbutton 202. The closure of contacts 200a of the "inch" button and contacts 202a of the "run" button permits current flow through contacts 201a to the coil of relay 1CR. Contacts 1CR1 close to maintain relay 1CR energized. Contacts 1CR2 close to energize the forward contactor F. Contacts 1CR4 close to energize the reset coil 198 of plugging relay PR to move the contacts PR1 and PR2 from the positions shown. In other words, coil 198 is momentarily energized to close contacts PR1 and open contacts PR2 in which position they remain until plugging occurs. The opening of contacts PR2 interrupts the energization to coil 198. Also when relay 1CR is energized, contacts 1CR3 close to energize relay 2CR and close contacts 2CR1. Relay 89 is thereby energized to open contacts 87 and close contacts 86. The running speed setting potentiometer is thereby rendered effective and the motor is controlled at running speed. Limit switches 203 and 204 are provided at the press paper feedtable and last press unit (not shown) to prevent energization of relay 2CR if both are open. Under such circumstances the press can only be run at trip slow speed.

The motor 2 is stopped by depressing the "stop" pushbutton 201. Contacts 201a are thereby opened to interrupt the current flow to the coil of the forward contactor permitting it to drop out. At the same time the opening of contacts 201a interrupt the flow of current to the coil of relay 1CR permitting relay 1CR to return to its normal position. When the forward contactor F drops out, contacts 5 open to deenergize motor 2. Contacts F1 close to enable the energization of the reverse contactor R. Contacts F2 open to drop out relay 3CR to thereby reclose contacts 3CR1 (FIG. 2) to impose a definite stop signal to the error detection circuit ED. Contacts F3 close to complete the circuit to the coil of plugging control relay PCR.

The energization of plugging control relay PCR initiates the plugging of motor 2. Contacts PCR1, PCR2 and PCR3 open to interrupt the motor secondary voltage feedback signal. This protects the circuit elements of error detector ED from the possibly injurious high voltages that occur in the motor secondary upon plugging.

Also, the reduction of the feedback signal to zero appears to error detector ED to be a signal representative of maximum or synchronous speed forcing the amplified speed error to zero, and allowing the signal into circuit LD to be composed only of a torque signal.

Further, upon energization of relay PCR, contacts PCR6 open to prevent energization of relay 3CR. Closure of contacts PCR5 connects plugging relay lockout coil 197 into the secondary circuit between conductors 6 and 8. The plugging relay drop out level is adjusted by means of a variable resistor 205. Simultaneously, contacts PCR4 close to energize the reverse contactor R. Plugging then starts upon closure of contacts 4. Contacts R4 close to energize the plugging relay closing coil 199 which is ineffective to close the plugging relay PR until the motor secondary voltage decreases to a level determined by the setting of resistor 205. As the motor slows, the force of coil 199 overcomes the force of coil 197 and the plugging relay PR is actuated to the position shown. The opening of contacts PR1 deenergize relay PCR to return to its normal position. The opening of contacts PCR4 deenergize the reverse contactor. Contacts 4 then open and plugging ceases. The system is then in its original stopped condition.

Motor 2 can be run in a reverse direction by depressing the reverse pushbutton 206 having contacts 206a. Current then flows through contacts 201a, 206a and F1 to energize the coil of the reverse contactor R. Power contacts 4 close to energize motor 2 in the reverse direction. Contacts R1 open to prevent energization of relays 1CR, 2CR and 89. The motor therefore can be run in the reverse direction only at trip slow speed as set on potentiometer 80. Interlocking contacts R2 open to prevent energization of the forward contactor F. Contacts R3 close to energize relay 3CR and thereby render the trip slow speed setting potentiometer 80 effective.

It can now be seen that the aforedescribed system is effective to regulate the speed of motor 2 at a speed as set of potentiometer 79 or 80. Further, the secondary curent or motor torque as sensed by resistor 16 is regulated. Either a change in speed or motor load will be effective to change the firing cycles of SCR1 and SCR2 and thereby change the motor secondary impedance.

It is now apparent why the connection of the speed reference potentiometers 79 and 80 to an unregulated voltage source is important. When line voltage changes the secondary voltage changes proportionately. The speed reference voltage in conductors 101, 102 and 103 would also change proportionately. This change in feedback signal, if the speed reference signal remained constant, would call for a speed change which is actually unwanted. The fact that the speed reference signal also changes with the variation in line voltage is effective to cancel out the change in feedback signal. Consequently, the speed of motor 2 is made independent of fluctuations in line voltage.

While the invention hereinbefore described is effectively adapted to fulfill the objects stated, it is to be understood that we do not intend to confine our invention to the particular embodiment disclosed since it is susceptible of various modifications without departing from the scope of the appended claims.

What is claimed is:

1. A control system for a wound rotor A.C. motor comprising:
   (a) speed reference means providing a speed reference control signal
   (b) speed feedback means providing a motor feedback control signal derived from the secondary voltage of said motor which is inversely proportional to motor speed
   (c) speed error detection means providing an error control signal continuously indicative of the difference between said reference and speed feedback control signals
   (d) secondary circuit sensing means providing a current control signal directly proportional to the motor secondary current
   (e) motor secondary impedance control means for varying the impedance of the motor secondary circuit, and
   (f) means for controlling said secondary impedance control means in accordance with the algebraic resultant of said error and current control signals so that motor secondary impedance is decreased whenever there is a decrease in motor speed or an increase in motor secondary current occurring separately or concurrently.

2. The combination according to claim 1 wherein said secondary impedance control means comprises rectifiers for rectifying the motor secondary voltage, a resistor connected across said rectified voltage and electronic means controllable to shunt said resistor for varying periods, and wherein means operative in accordance with the algebraic resultant of said error and current control signals vary the conduction periods of said electronic means.

3. The invention as defined in claim 1 in which said reference signal is provided by speed reference means powered from the line voltage applied to the primary of said motor through an unregulated voltage supply, said reference signal therefore being variable with said line voltage.

4. The invention as defined in claim 1 together with:
   plugging means for plug stopping said motor; and
   means responsive to the operation of said plugging means for disconnecting said speed feedback signal during plugging.

5. The invention as defined in claim 1 in which said speed error detection means includes switching means responsive to the stopping of said motor for substituting a signal calling for zero speed for the reference speed signal.

6. The invention as defined in claim 4 together with means for substituting a false signal indicating maximum motor speed for said speed feedback signal during plugging.

References Cited

UNITED STATES PATENTS

| | | | |
|---|---|---|---|
| 3,017,554 | 1/1962 | Fischer | 318—239 |
| 3,217,222 | 11/1965 | Lee | 318—240 |
| 3,227,937 | 1/1966 | Koppelmann et al. | 318—237 |
| 3,302,086 | 1/1967 | Jensen | 318—373 |
| 3,365,642 | 1/1968 | Risberg | 318—376 |
| 3,379,947 | 4/1968 | Lalonde | 318—237 |

ORIS L. RADER, Primary Examiner

K. L. CROSSON, Assistant Examiner

U.S. Cl. X.R.

318—241, 332